(12) United States Patent
Masuda et al.

(10) Patent No.: US 8,186,889 B2
(45) Date of Patent: May 29, 2012

(54) OPTICAL CONNECTING MEMBER AND DISPLAY APPARATUS

(75) Inventors: Hiroshi Masuda, Tsukuba (JP); Atsushi Takahashi, Yuki (JP); Yasushi Sugimoto, Tsukuba (JP); Tomoaki Shibata, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 488 days.

(21) Appl. No.: 12/302,806

(22) PCT Filed: Mar. 27, 2008

(86) PCT No.: PCT/JP2008/055918
§ 371 (c)(1),
(2), (4) Date: Nov. 28, 2008

(87) PCT Pub. No.: WO2008/120680
PCT Pub. Date: Oct. 9, 2008

(65) Prior Publication Data
US 2009/0196066 A1 Aug. 6, 2009

(30) Foreign Application Priority Data

Mar. 30, 2007 (JP) .............................. P2007-093903

(51) Int. Cl.
*G02B 6/36* (2006.01)
*G02B 6/10* (2006.01)
*F21V 8/00* (2006.01)
*G02F 1/1335* (2006.01)

(52) U.S. Cl. .............. 385/53; 385/25; 385/49; 385/901; 385/129; 362/97.1; 362/97.2; 362/97.3; 362/561; 349/56; 349/58; 349/61; 349/62

(58) Field of Classification Search ................ 385/53, 385/25, 49, 50, 55, 56, 88, 92, 115, 116, 385/129, 131, 133, 146, 147, 901; 362/97.1, 362/97.2, 97.3, 97.4, 561; 349/56, 58, 61, 349/62
See application file for complete search history.

(56) References Cited

U.S. PATENT DOCUMENTS

| 5,836,669 A | * | 11/1998 | Hed | .............................. | 362/92 |
| 6,354,724 B1 | * | 3/2002 | Sakashita | ..................... | 362/558 |
| 6,429,912 B2 | * | 8/2002 | Nagasaki | ........................ | 349/58 |

(Continued)

FOREIGN PATENT DOCUMENTS

DE 199 18 053 A1 11/2000

(Continued)

OTHER PUBLICATIONS

Australian Office Action of Appln. No. 2008233689 dated May 4, 2010.

(Continued)

*Primary Examiner* — Brian Healy
(74) *Attorney, Agent, or Firm* — Antonelli, Terry, Stout & Kraus, LLP.

(57) ABSTRACT

Disclosed is an information processing device with lighting function that realizes reduced power consumption and cost reductions. The optical connecting member 17 flexibly connects between a light guide plate 14 of a displaying part side and a light guide plate 21 of a key operating part side, thereby guiding light emitted from a white light LED 13 of a displaying part side to key operating part side.

24 Claims, 12 Drawing Sheets

U.S. PATENT DOCUMENTS

| | | | | |
|---|---|---|---|---|
| 6,470,132 | B1 * | 10/2002 | Nousiainen et al. | 385/146 |
| 6,571,043 | B1 * | 5/2003 | Lowry et al. | 385/120 |
| 6,981,791 | B2 | 1/2006 | Higashiyama | 362/600 |
| 7,095,387 | B2 * | 8/2006 | Lee et al. | 345/4 |
| 7,334,930 | B2 | 2/2008 | Chang et al. | 362/602 |
| 7,630,037 | B2 | 12/2009 | Shimura | 349/115 |
| 2009/0196066 | A1 * | 8/2009 | Masuda et al. | 362/561 |
| 2009/0322985 | A1 * | 12/2009 | Mizuuchi | 349/62 |

FOREIGN PATENT DOCUMENTS

| | | |
|---|---|---|
| EP | 0884525 B1 | 8/2006 |
| JP | 11-219608 | 8/1999 |
| JP | 2004-295187 | 10/2004 |
| JP | 2006-019212 | 1/2006 |
| JP | 2006-085057 | 3/2006 |
| JP | 2006-252789 | 9/2006 |
| JP | 2007-042319 | 2/2007 |
| TW | M262652 U | 4/2005 |
| WO | WO 02/21730 A2 | 3/2002 |

OTHER PUBLICATIONS

Chinese Office Action with English translation thereof dated Sep. 9, 2010.
International Preliminary Examination Report dated Oct. 22, 2009.
Korean Office Action dated Jun. 26, 2010 with translation.
Official Action mailed Jun. 22, 2011, in counterpart Chinese Application No. 200880000245.7, 7 pages, Chinese Patent Office, China.
Communication mailed Nov. 24, 2011, in counterpart Chinese Application No. 200880000245.7, 9 pages, Chinese Patent Office, China.

* cited by examiner (a)

(b)

(c)

(d)

(a)

(b)

(c)

(d)

(e)

(a)

(b)

(c)

(d)

OPTICAL CONNECTING MEMBER AND DISPLAY APPARATUS

TECHNICAL FIELD

The present invention relates to an optical connecting member that connects two lighting regions and a display apparatus that utilizes this optical connecting member.

BACKGROUND ART

Information processing devices such as portable telephones or personal digital assistants (PDA) as well as laptop computers and the like always provide illumination for a liquid crystal display that displays images and characters, and now it is common for these types of devices to provide illumination of the parts of the device for operating the keys as well.

For example, as disclosed in the following Patent Document 1, in the portable telephone device both the display part and the key operating part are each provided with a dedicated light source. The liquid crystal display part is lighted by a backlight utilizing a light guide plate, while the key operating part is illuminated by an LED or the like attached to a substrate.

[Patent Document 1] Japanese Patent Application Laid-Open No. 2004-295187

[Patent Document 2] Patent publication No. 2004-508599

DISCLOSURE OF THE INVENTION

Problems Solved by the Invention

In the portable telephone device with lighting function provided disclosed in Patent Document 1, above, dedicated light sources are provided for each of the liquid crystal display and the keyboard operating parts, meaning that power consumption is substantial and the battery will be quickly exhausted. Further, usually a plurality of keys are provided in a key operating part which raises concerns that having to provide light source to each individual key mitigates against cost reductions.

Against this background, the present invention aims to provide a display apparatus and an optical connecting member in which there is reduced power consumption by an information processing device provided with lighting functionality, and that furthermore enables cost reductions.

Means for Solving the Problem

With the foregoing problems in view, the optical connecting member according to the present invention is configured such that between a first lighting region having a light source and a light guide plate, and a second lighting region, light emitted from an end surface of the light guide plate is guided to the second lighting region. Because the optical connecting member operates to guide light, via the light guide plate, from the light source of the first lighting region to the second lighting region an independent light source is not required for the second lighting region.

It is preferable in this optical connecting member, that the transmittance of light of a wavelength region corresponding to the color illuminating the second lighting region is not less than 85%. It is preferable, especially when the second lighting region is illuminated with white light, that the optical connecting member is of a transparent material such that the transmittance of light in the wavelength region from 420 nm-780 nm is not less than 85%. Where this condition is fulfilled, if light is in the wavelength region of 420 nm-780 nm, the second lighting region can utilize the light that passes with the transmittance of light not less than 85% from the light source of the first lighting region.

Further, it is preferable in the optical connecting member, that the rate of increase of loss in the 360° bending test with radius of curvature 2 mm is not more than 1 dB. That is to say, even where there are strict usage conditions such that there is 360° bending for radius of curvature 2 mm, the optical connecting member minimizes light loss.

Again, it is preferable in the optical connecting member, that the rate of increase of optical insertion loss after the repetitive bending test with radius of curvature 5 mm is repeated 100,000 times is not more than 1 dB. Bending at a radius of curvature 5 mm repeated 100 times each day and further continuing this over three years results in testing 100,000 times. Even under these conditions of usage, the increase of optical insertion loss is not more than 1 dB.

Further, it is preferable in the optical connecting member, that mechanical damage such as cracks dose not occur in the core after the repetitive bending test with radius of curvature 2 mm is repeated 100,000 times. The existence of such mechanical damage such as cracks can be confirmed under a magnifying lens, under a microscope or with the naked eye.

Moreover, it is preferable in the optical connecting number, that the coefficient of elasticity using a film tensile test is 0.05-6 GPa.

Again, it is preferable that the optical connecting member has a core part and a cladding part the refractive index of which is lower than that of the core part. Thus, light travels in the core part which has a higher refractive index.

Further, it is preferable that the relative refractive index difference of the cladding part and the core part of the optical connecting member is 1-50%. Here, this includes cases in which the optical connecting member comprises only the core part and the cladding part is air.

Moreover, it is preferable that the thickness of the end surface opposing the light guide plate of the first lighting region of the optical connecting member is 0.01-2 mm.

Again, it is preferable in the optical connecting member that the exterior of the cladding part has a supporting film.

Further, the optical connecting member may use an optical waveguide having a core part and cladding part.

Moreover, the optical connecting member may employ a configuration of glass fiber, plastic fiber or resin tubes arranged in parallel.

Again, the optical connecting member may employ a configuration of glass fiber, plastic fiber or resin tubes laid inside resin.

In order to solve the above described problems, the display apparatus according to the present invention provides any of the optical connecting members as described above, as well as a first lighting region and a second lighting region, the first lighting region has a light source and a light guide plate, and the optical connecting member guides light emitted from the end surface of the light guide plate to the second lighting region. The optical connecting member of the display apparatus guides light from the light source of the first lighting region to the second lighting region via a light guide plate, thus the display apparatus does not require an independent light source in the second lighting region.

In this display apparatus, the first lighting region and the optical connecting member, and the optical connecting member and the second lighting region are connected by an adhesive agent comprised of resin.

Again, in the display apparatus the first lighting region and the optical connecting member, and the optical connecting member and the second lighting region are connected by a film shaped sticky resinous sheet or by a resinous tape.

Further, the first lighting region and the optical connecting member, and the optical connecting member and the second lighting region are connected by a film shaped sticky resinous sheet or by a resinous tape, moreover, these may be connected by an adhesive agent comprised of resin.

Moreover, in the display apparatus, the optical connecting member has a core part and cladding part, and the first lighting region and the optical connecting member, as well as the optical connecting member and the second lighting region, are connected by being laminated by a cladding layer formed so as to cover both above and below the core part of the optical connecting member.

Again, the first lighting region and the optical connecting member, and the optical connecting member and the second lighting region may be mechanically joined using a connector part.

Further, the second lighting region has a light guide plate, and the light guide plate of the first lighting region as well as the optical connecting member and the light guide plate of the second lighting region are formed into an integrated body by the same flexible, resinous material.

Moreover, it is preferable that the first lighting region is provided with a closing lid part, that the second lighting region is provided with a main body, and that the optical connecting member and the closing lid part and the main body are rotatably connected via a hinge part. Here, "rotatably connected" means connected so as to be able to fold and mechanistically turn, rotating at a point. If at least one of the folding action or the turning rotating action is possible, it can be said to be rotatable.

Again, it is preferable that a movable part is provided for a configuration that connects the first lighting region to the closing lid part, the second lighting region to the main body, and the optical connecting member slides with the closing lid part and the main body part.

The display apparatus according to the present invention could include for example, that of a foldable portable telephone, a portable telephone device such as a twin screen portable telephone or the like, a personal computer, a twin screen portable game machine or an electronic dictionary with screen for handwritten input.

That is to say, the display apparatus comprises a first lighting region providing a surface light source part having a light source and a light guide plate, and a liquid crystal display part that is illuminated by the surface light source, which first lighting region reflects or passes light from the light source, emits light from a first outgoing edge opposing the liquid crystal display part to illuminate the liquid crystal display part, and also emits light from a second end surface opposing the optical connecting member; the optical connecting member that flexibly connects the first lighting region and the second lighting region positioned between them, and guides the light emitted from the second end surface of the first lighting region to the second lighting region; and a second lighting region having a key operating part connected to the first lighting region via the optical connecting member so as to be able to open and close: such that the display apparatus could for example function as an information processing device with lighting functionality, that displays image information or character information on the liquid crystal display part based on operations performed using the operating part It is preferable that the optical connecting member be of a resinous material. It is preferable that this resinous material be for example phenoxy resin, epoxy resin, (meta) acrylic resin, polycarbonate, polyarylate, polyetheramide, polyetherimide or polyethersulfone, or again, a derivative of at least one of these.

Among these resinous materials it is preferable, considering heat resistance properties, that the material has an aromatic ring in the principal chain, so phenoxy resin is the most suitable. Again, considering three-dimensional linkage and even greater heat resistance properties, epoxy resin, especially epoxy resin hardened at room temperature (25°) is most preferable. Considering transmissive ability the most preferred materials are phenoxy resin and (meta) acrylic resin. Here, (meta) acrylic resin refers to acrylic resin or methacrylic resin.

It is preferable, considering the properties of flexibility, toughness and transmissive ability to use a polyester such as polyethylene terephthalate (PET), polybutylene terephthalate or polyethylene naphthalate or the like, polyolefin such as polyethylene or polypropylene or the like, an alicyclic polyolefin such as Arton (registered trademark of JSR Corporation), polycarbonate, polyamide, polyimide, polyamidomide, polyetherimide, polyethersulfide, polyethersulfone, polyarylate, liquid crystal polymer, polysulfone or silicon resin.

Again, the optical connecting member may be a resinous composition including at least one from among (A) binder polymer, (B) photopolymer compound or (C) photopolymer initiator.

It is preferable that the optical connecting member be comprised of a resinous material or resinous composition that has the transmittance of light not less than 85% of light in wavelength regions corresponding to the color of illumination of the second lighting region. Especially when white light is illuminated in the second lighting region it is preferable that the transmittance of light of a light transmissive material is not less than 85% of light of wavelengths from 420 nm-780 nm.

Further, the optical connecting member may include at least one additive from among an antioxidant, an anti-yellowing agent, a UV light absorbent, a visible light absorbent, a coloring agent, a plasticizer, a stabilizing agent or a filler.

Moreover, the optical connecting member may have added therein a transmissive spectrum control agent such as a coloring agent or a fluorescent substance in order to control the transmission spectrum in coordination with the color illuminating the second lighting region.

Again, the optical connecting member according to the present invention not only guides light emitted from the end surface of the light guide plate of the first lighting region, providing light used for illuminating the second lighting region which may be a key operating part or the like, it also provides a function of delivering an analogue or digital signal of electricity or light, and integrates the power supply wiring and ground wiring.

For example, electrical wiring such as signal carrying wires for carrying electric signals, or power supply wires as well as ground wires or the like can be formed on the surface of an optical connecting member providing functionality for passing light used for illumination. The method for producing such electrical wiring can be for example: a method of adhering a flexible printed wiring substrate to the surface of such an optical connecting member used for illuminating using an adhesive agent; a method of directly forming electrical wiring on the surface of such an optical connecting member used for illuminating; a method of forming an optical waveguide as an optical connecting member used for illuminating that involves a buildup approach, first forming over a flexible printed wiring substrate a core pattern consisting of a consecutive arrangement having ground layers underneath followed by core layers over the ground layers, then forming an upper cladding layer; or a method of forming an optical connecting member used for illuminating such as an optical waveguide or the like over a film with metallic foil attached, then patterning the electrical wiring on the metal.

Moreover, in addition to directing light used for illumination, optical signal transmission regions can be formed on the optical connecting member used for illumination, to enable digital or analog signals to be sent as light, thus for example, a flexible optical waveguide can be formed on the surface of the optical connecting member used for illumination, or optical wiring for signal transmission and regions for guiding light used for illumination can be formed arranged abreast inside the optical connecting member used for illumination. Further, both transmission paths for sending electrical signals and transmission paths for sending optical signals can be formed on the optical connecting member used for illumination.

A single example will now be described with reference to FIG. 1(a). FIG. 1(a) is a cross sectional drawing showing the formation of electrical wiring such as ground wiring, or power supply wiring or wiring for delivering electrical signals on the surface of an optical connecting member 100 that provides a function for passing light used for illumination. The part for delivering light used for illumination has the configuration of the optical waveguide 101 comprised of a core 101a through which light passes and cladding 101b covering the core. In FIG. 1(a) the electrical wiring part is configured having a flexible printed wiring substrate 102 adhered via an adhesive agent 103 to the surface of the optical waveguide 101 through which the illuminating light passes.

FIG. 1b shows a configuration in which an optical waveguide 104 for delivering optical signals is adhered on the surface of an optical connecting member 100 that provides functionality for carrying light used for illumination. The optical waveguide 104 for carrying optical signals is comprised of a core 104a through which light passes and cladding 104b covering the core.

FIG. 1(c) shows a configuration in which an optical electrical composite substrate providing both an optical waveguide 104 for carrying optical signals and electrical wiring 102 like a flexible printed wiring substrate having ground wires, power supply wires and signal wires for delivering electrical signals is adhered over the surface of an optical connecting member 100 providing functionality for carrying light used for illumination.

It is also suitable, that instead of adhering an optical waveguide to the surface of the optical connecting member used for illumination using an adhesive agent, there is a buildup over the surface of the optical connecting member to form an optical waveguide for optical signal transmission, realized by first forming over the surface of the optical connecting member a core pattern consisting of a consecutive arrangement having ground layers underneath followed by core layers over the ground layers, and then adhering a flexible printed wiring substrate over the optical waveguide using an adhesive agent. Further, it is possible to form a consecutive buildup of optical waveguides for optical transmission and optical waveguides for illumination over a film with metallic foil attached then patterning the electrical wiring on the metal.

FIG. 1(d) shows an example in which optical wiring for signal transmission and regions for guiding light used for illumination are formed arranged abreast inside the optical connecting member 100 used for illumination, and then a flexible printed wiring substrate 102 is applied thereover. The optical waveguide core 101c used for sending optical signals is formed arranged abreast with the optical waveguide core 101a for illumination in the cladding 101b.

Here, the width of the illumination optical connecting core 101a and the width of the optical signal transmission core 101c may be the same or different, while the height of these also, may be the same or different. The size of the cores may be altered in accordance with the respective function.

Effects of the Invention

The display apparatus employing the optical connecting member related to the present invention realizes reduced power consumption and cost reductions.

BRIEF DESCRIPTION OF THE DRAWINGS

FIG. 13 FIGS. 13(a) and 13b are cross-sectional views of the area in which the keys are located in the key operating part, and FIG. 13(c) shows the light guide plate for the case shown in FIG. 13b;

BRIEF DESCRIPTION OF THE REFERENCE SYMBOLS

Figure 1:
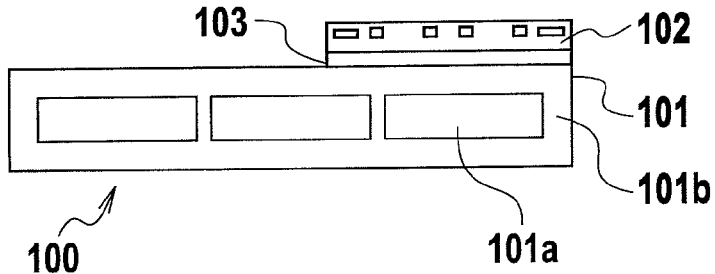
FIG. 1 shows a cross-section of an optical connecting member.
Figure 1:
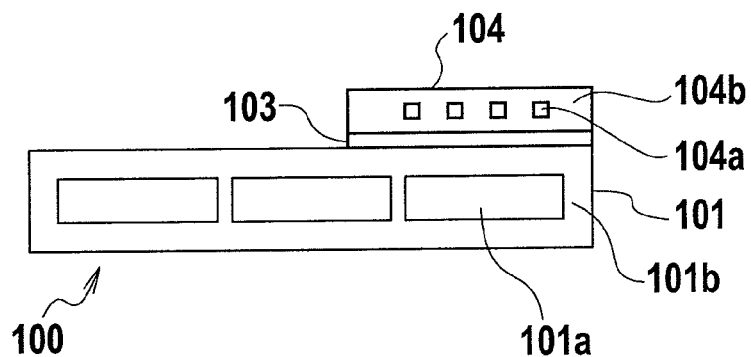
Figure 1:
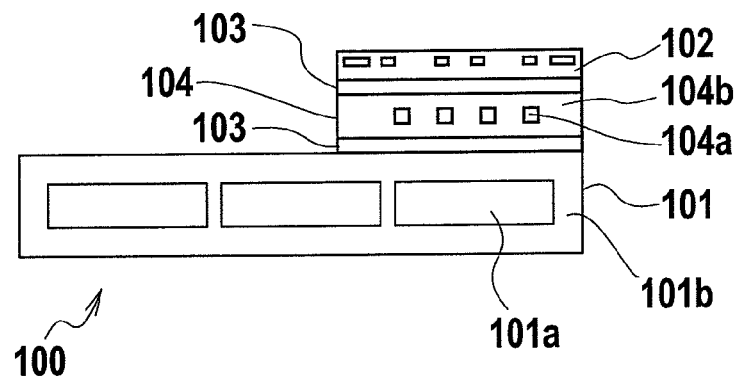
Figure 1:
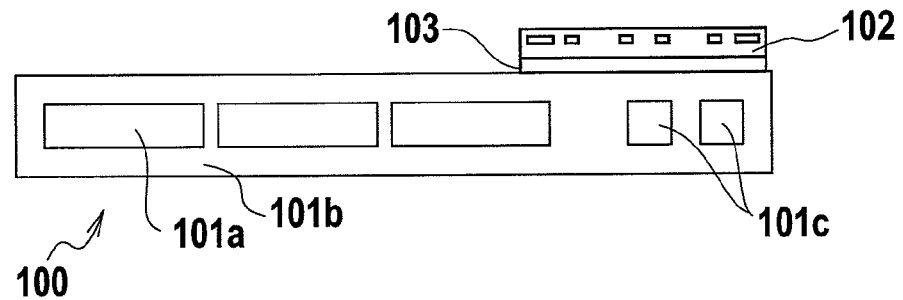

1 Portable telephone
2 Key operating part

3 Surface
4 Main body
5 Hinge part
6 Closing lid part
8 Display part

BEST MODE FOR CARRYING OUT THE
INVENTION

The best modes for carrying out the invention will now be described with reference to the drawings.

Figure 2:
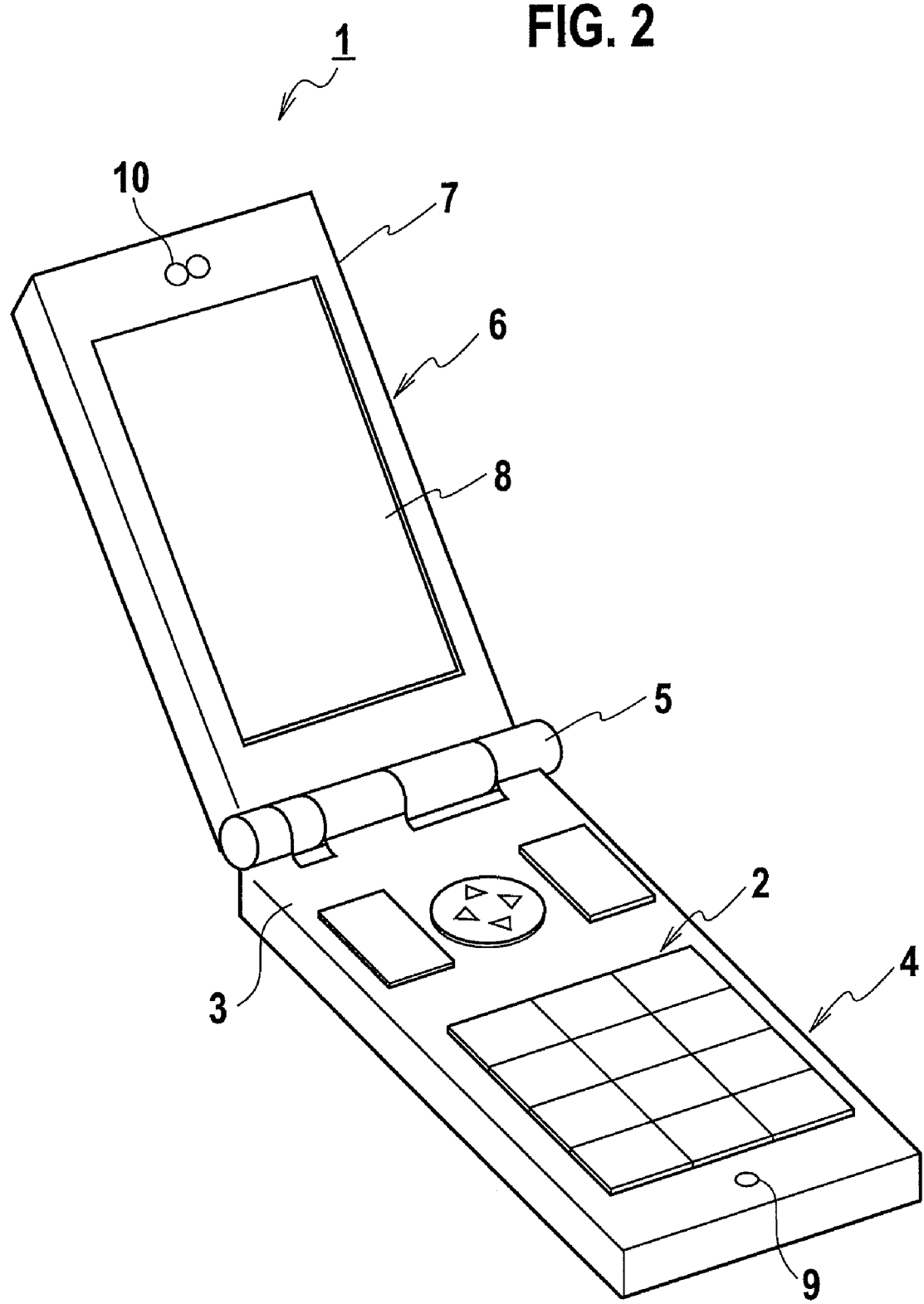
FIG. 2 is an external perspective view of a portable telephone that utilizes the present invention.

FIG. 2 is an external perspective view of a portable telephone that utilizes the present invention. This portable telephone device 1 is a folding type and provides a main body 4 further providing a surface 3 having a key operating part 2 that is the second lighting region. A closing lid part 6 is connected via a hinge part 5 so as to be able to open and close over the main body 4. That is to say, the main body 4 and closing lid part 6 are connected via the hinge part 5 so as to be able to rotate. The allowable angle of rotation may be within a range from 0-180°, or more preferably 0-360°. The surface 7 of the closing lid part 6 which forms the surface opposing the key operating part 2 is provided with a display part 8 that is the first lighting region. The display part 8 displays character or image information in response to operation of the key operating part 2 of the main body 4. For example, the display part 8 can display telephone numbers or previously taken images.

The main body 4 has the key operating part 2 comprised of a plurality of keys and a microphone 9 formed in the surface 3. Further, the main body 4 has housed internally, memory such as EEPROM or the like, a control part such as a CPU, and signal processing parts providing wireless functions and transmission functions or the like. A special characteristic of the main body 4 is the provision of the key operating part side, light guide plate that guides light emitted from a surface light source of the closing lid part 6 described subsequently, for illuminating the key operating part 2. The key operating part side, light guide plate can be simply of a light reflecting material such as silicon resin.

In addition to the display part 8 on the surface 7 side, the closing lid part 6 provides speakers 10. The display part 8 comprises a surface light source and a liquid crystal display part illuminated by the surface light source. The liquid crystal display part is provided with a surface light source within the closing lid part. The surface light source has a light source such as for example a white lighting LED and a display part side, light guide plate, that reflects or passes incoming light when light is input from this light source, to illuminate the liquid crystal display part. The surface light source and liquid crystal display part will be described in detail subsequently.

Moreover, between the main body 4 and the closing lid part 6 a flexible optical waveguide is provided that flexibly connects the display part side, light guide plate and the key operating part side, light guide plate and operates as an optical connecting member guiding light emitted from the light source to the key operating part side, light guide plate. The flexible optical waveguide passes partly within the hinge part 5 that rotatably connects the main body 4 and the closing lid part 6.

Figure 3:
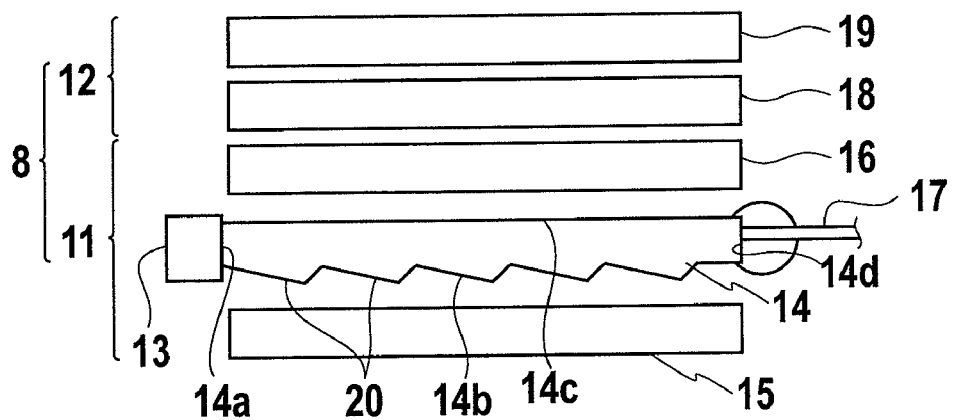
FIG. 3 is a side view of the display part shown in FIG. 2.

FIG. 3 is a side view of the display part 8 that is the first lighting region. The first lighting region has a light source and a light guide plate and for example may be configured as described above, such that the display part 8 has a plain light source 11 having a light source and a light guide plate and a liquid crystal display part 12 that is illuminated by the plain light source 11. The plain light source 11 is comprised for example of a white light LED 13 that emits light of wavelengths 420-750 nm, light guide plate of a display part side 14 which receives white light from the white light LED 13 via an end surface 14a, a reflecting plate 15 and a luminance enhancement sheet 16. The light guide plate of a display part side 14, the reflecting plate 15 and the luminance enhancement sheet 16 are stacked one on top of the other, comprising the plain light source 11. A diffusive film may be arranged between the light guide plate 14 and the luminance enhancement sheet 16. Further, the luminance enhancement sheet 16 may use not one sheet but two sheets stacked. An example of the light source 13 could be a white light LED that emits visible light of wavelengths 380-780 nm.

The light guide plate of a display part side 14 has the end surface 14a that is an end surface part into which light from the light source enters, the reflecting surface 14b that either reflects or passes incoming light entering via the end surface 14a, a first outgoing surface 14c that emits light input from the end surface 14a to the liquid crystal display part 12 side and a second outgoing surface 14d that emits the incoming light to the optical connecting member 17. The second outgoing surface 14d is disposed at the opposing side in relation to the end surface 14a.

The reflecting plate 15 is disposed at the reflecting surface 14b side of the light guide plate 14, and reflects light passing the reflecting surface 14b returning it to the display part side, light guide plate. The reflecting plate 15 may be formed by using the vacuum evaporation method or sputter method to apply a glossy metallic thin film such as silver or aluminum or the like over the surface of a plastic film for example.

The luminance enhancement sheet 16 is a film having a microprism, micro lens, diffraction lattice or hologram or the like, and functions to focus light emitted from the light guide plate of a display part side 14 in the direction of the liquid crystal cell 19.

The liquid crystal display part 12 comprises a light polarizing plate 18 into which light passing via the focusing lens 16 enters and liquid crystal cell 19 into which light passing via the light polarizing plate 18 enters. The liquid crystal cell 19 is comprised of liquid crystals inserted between two transparent substrates. A diffusive film may be disposed between the focusing lens 16 and the light polarizing plate 18.

Figure 4:
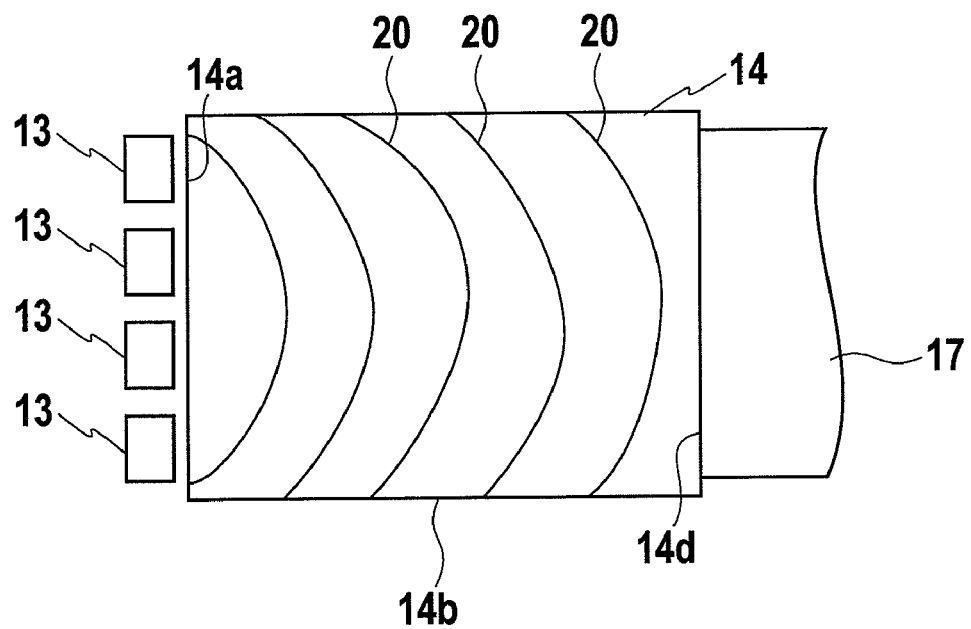
FIG. 4 is a plan view of the display part side, light guide plate shown in FIG. 3.

FIG. 4 is a plan view of the display part side, light guide plate 14. The light guide plate of a display part side 14 has a substantially rectangular form, having a substantially rectangular shaped first outgoing surface 14c and reflecting surface 14d opposing the first outgoing surface 14c. The material from which the light guide plate of a display part side 14 is made should be a transparent material having a constant refractive index, such as for example polymethylmethacrylate, polyolefin or polycarbonate or the like, but these examples are illustrative and not restrictive, and any thermoresin, thermal hardened resin or optical hardened resin is satisfactory.

The end surface 14a of the light guide plate 14 is substantially orthogonal to the first outgoing surface 14c and the reflecting surface 14b. The plurality of white light LED (light source) 13 are arranged linearly at substantially constant intervals opposing the end surface 14a. Light emitted from these light source 13 enters the light guide plate of a display part side 14 via the end surface 14a. The first outgoing surface 14c has a substantially planar form.

The light guide plate 14b is substantially parallel to the first outgoing surface 14c of the light guide plate 14 and is formed having a plurality of reflecting grooves 20. These reflecting grooves 20 are formed in a direction substantially parallel or circular arc shaped in relation to the end surface 14a, and run continuously from the end surface 14a to the region at the end face of the opposite side of the end surface 14a. The cross-sectional form of these reflecting grooves 20 is asymmetrical, and the surfaces inclined toward the end surface 14a side have a wider width than the surfaces inclined toward the opposite side of the entry surface. Instead of the reflecting grooves 20, it is also suitable to have dot patterns formed on the reflecting surface 14b. These dot patterns can be of a printed reflective material or an imprinting concave convex form. The size, arrangement and concave-convex form of the dot patterns should be determined to enable uniform emission of light from the reflecting surface 14b.

The light guide plate of a key operating part side will now be described. The light guide plate of a key operating part side operates to guide light emitted from the second outgoing surface 14d of the light guide plate of a display part side 14 to illuminate the key operating part 2. In the same manner as applies with respect to the light guide plate of a display part side 14, the material for the light guide plate of a key operating part side should be a transparent material having a constant refractive index. This could be for example polymethylmethacrylate, polyolefin or polycarbonate or the like, but these examples are illustrative and not restrictive.

Figure 5:
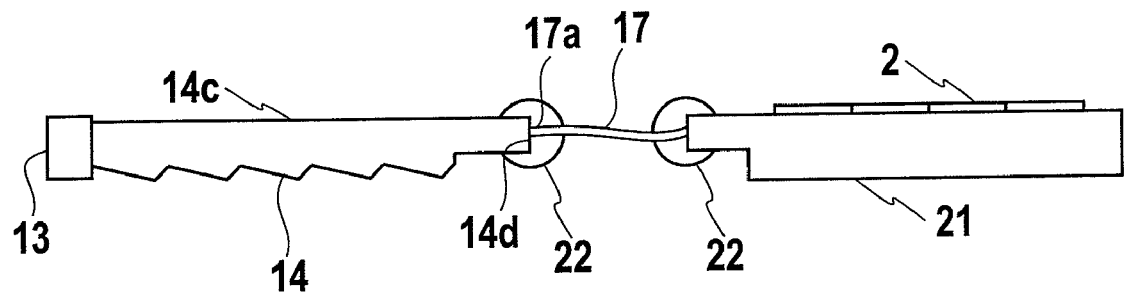
FIG. 5 is a side view showing the condition in which the display part side, light guide plate and key operating part side, light guide plate are connected via an optical connecting member.

FIG. 5 is a cross-sectional view showing the condition in which the light guide plate 14 of the first lighting region and the light guide plate of a key operating part side 21 of the second lighting region are connected by the optical connecting member 17. The optical connecting member 17 is a connecting member that flexibly connects the second outgoing surface 14d of the light guide plate 14 and the light guide plate of a key operating part side 21, and guides light from the light source 13 emitted via the second outgoing surface 14d to the light guide plate of a key operating part side 21. The optical connecting member 17 is highly refractive, heat resistant and transparent. It passes light of wavelengths 420-750 nm from the light source 13 and also, visible light of wavelengths 380-780 nm. The optical connecting member 17 is comprised of a transparent material that has the transmittance of light not less than 85% of light of wavelengths 420 nm-780 nm incoming from the light guide plate 14. Accordingly, if the light is of wavelengths 420 nm-780 nm, the second lighting region can utilize light from the light source of the first lighting region that passes due to this transmittance of light of not less than 85%.

This kind of optical connecting member 17 can be constructed by arranging glass fibers, plastic fibers or resin tubes side-by-side, or by laying plastic fibers, glass fibers or resin tubes buried in resin. A concrete description of the configuration follows.

The optical connecting member 17 should preferably be of a resinous composition or resinous material that passes not less than 85% of light of wavelength regions corresponding to the color of light illuminating the second lighting region. When the second lighting region is illuminated with white light, it is preferable that this resinous material has the transmittance of light not less than 85% in relation to light of wavelengths 420 nm-780 nm.

The optical connecting member 17 should preferably be comprised of a resinous material, for example phenoxy resin, epoxy resin, (meta) acrylic resin, polycarbonate, polyarylate, polyamide, polyimide, or polyethersulfone, or a derivative of these.

Among these resinous materials it is preferable, considering heat resistance properties, that the material has an aromatic ring in the principal chain, so phenoxy resin is the most suitable. Again, considering three-dimensional linkage and even greater heat resistance properties, epoxy resin, especially epoxy resin hardened at room temperature (25°) is most preferable. Considering transmissive ability the most preferred materials are phenoxy resin and (meta) acrylic resin. Here, (meta) acrylic resin refers to acrylic resin or methacrylic resin.

Considering the properties of flexibility, toughness and transmissive ability the material used could be polyester such as polyethylene terephthalate (PET), polybutylene terephthalate or polyethylene naphthalate or the like, polyolefin such as polyethylene or polypropylene or the like, an alicyclic polyolefin such as Arton (registered trademark of JSR Corporation), polycarbonate, polyamide, polyimide, polyamidomide, polyetherimide, polyethersulfide, polyethersulfone, polyarylate, liquid crystal polymer, polysulfone or silicon resin.

Further, the optical connecting member 17 may be a resinous composition including at least one from among (A) binder polymer, (B) photopolymer compound or (C) photopolymer initiator. Additionally, the optical connecting member 17 may, as necessary, include at least one additive from among an antioxidant, an anti-yellowing agent, a UV light absorbent, a visible light absorbent, a coloring agent, a plasticizer, a stabilizing agent, a filler or a transmissive spectrum control agent.

Further, FIG. 5 shows the configuration in which the optical connecting member 17 and the display part side, light guide plate 14 of the first lighting region, and the optical connecting member 17 and the key operating part side, light guide plate 21 of the second lighting region are connected by an adhesive agent 22 comprised of resin. Light from the light source 13 enters the light guide plate 14, is emitted from the first outgoing surface 14c and illuminates the liquid crystal display part 12, and is emitted from the second outgoing surface 14d to the optical connecting member 17. The optical connecting member 17 guides the light entering from the entry surface 17a to illuminate the key operating part 2.

Accordingly, the portable telephone 1 simultaneous with using light from the light source 13 to illuminate the liquid crystal display part 12, can use the same light from the light source 13 to illuminate the cladding layer 24.

That is to say, the optical connecting member 17 in the portable telephone 1 guides light from the light source of the first lighting region via a light guide plate to the second lighting region, thus the second lighting region does not require an independent light source, accordingly, the portable telephone 1 realizes reduced power consumption and cost reductions.

Figure 6:
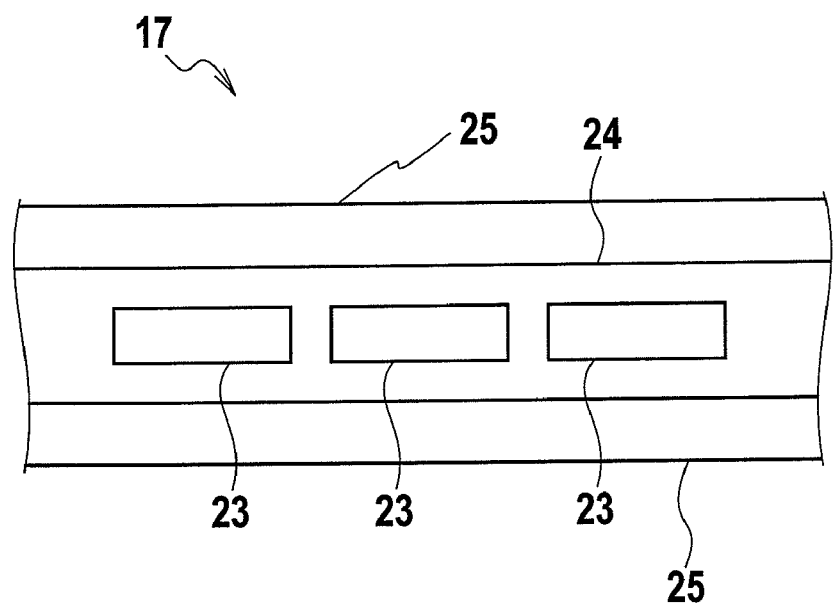
FIG. 6 is a cross-sectional view of the optical connecting member.

FIG. 6 is a cross-sectional view of the optical connecting member 17. The optical connecting member 17 is a flexible optical waveguide that comprises a core 23 comprised of resin forming a core layer that has a high refractive index and a cladding layer 24 comprised of resin used for forming cladding that has a low refractive index. The cladding layer is protected by a cover film 25.

The core 23 is formed by irradiating the core layer comprised of core layer forming resin via a negative mask pattern with excited light rays irradiated in image form, then applying developing processes to form a pattern. The cover film 25 can be arranged on either side of the cladding layer 24. By applying the cover film 25 the flexibility and toughness of the cover film 25 is added to the optical connecting member 17. Further, as the optical waveguide is less susceptible to soiling and damage it becomes easier to handle.

Figure 7:
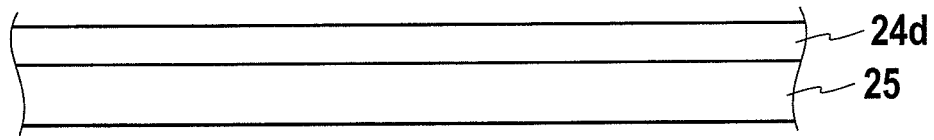
FIG. 7 shows the process for producing the flexible optical connecting member.
Figure 7:
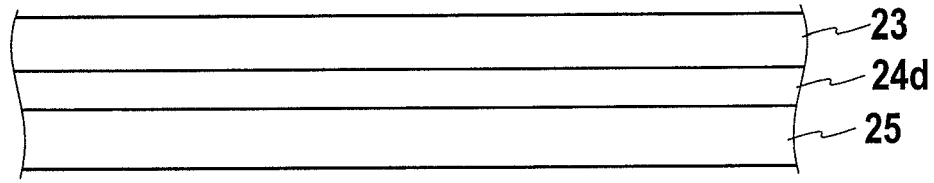
Figure 7:
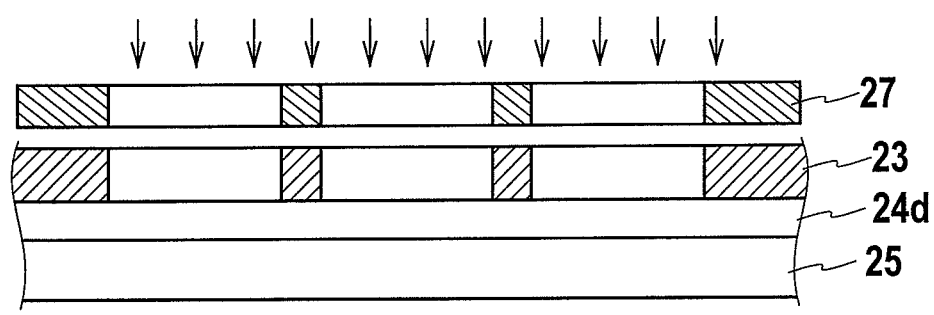
Figure 7:
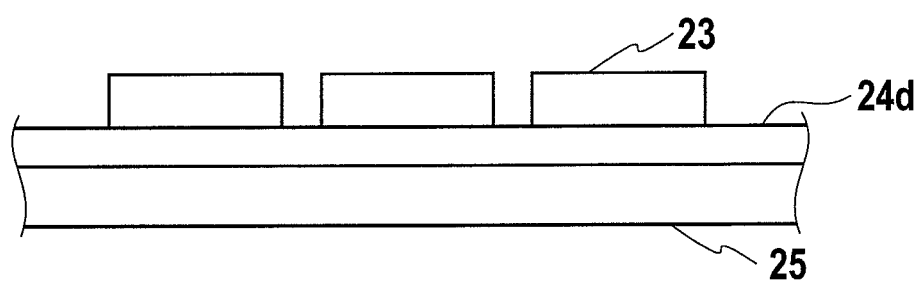
Figure 7:
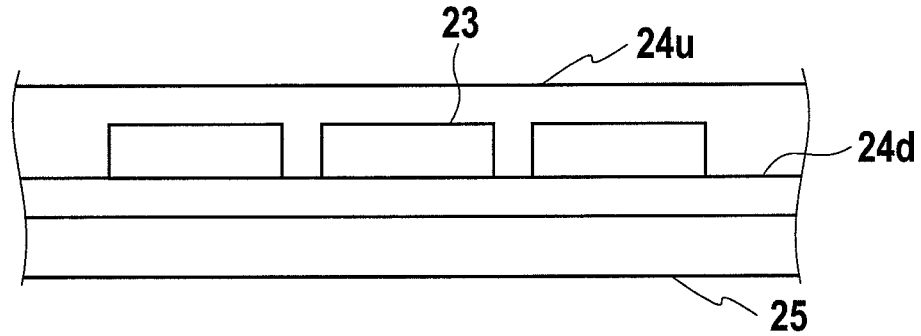

FIG. 7 shows the process for producing a flexible optical waveguide. Here, the cladding is formed of a lower cladding 24d and an upper cladding 24u. At step (a), the lower cladding 24d is formed over the substrate 25 by a laminating/hardening (exposure and thermal application) process. Next, at (b) the core film is laminated, forming the core layer 23. At (c), the core layer is exposed to light via a core pattern mask. The core 23 is formed when the development process is applied at step (d). Then at (e) the upper cladding 24u is laminated with film and hardened so as to cover the core 23 thereby completing the optical connecting member 17.

For the cladding layer, which should have a lower refractive index than the core layer, it is suitable to use a photosensitive resinous composition or thermal hardenable resinous composition hardened either optically or thermally.

For the core layer, which should have a higher refractive index than the cladding layer, it is suitable to use a photosensitive resinous composition that can sustain formation of a core pattern through irradiation of an excited light source such as ultraviolet rays or the like.

Figure 8:
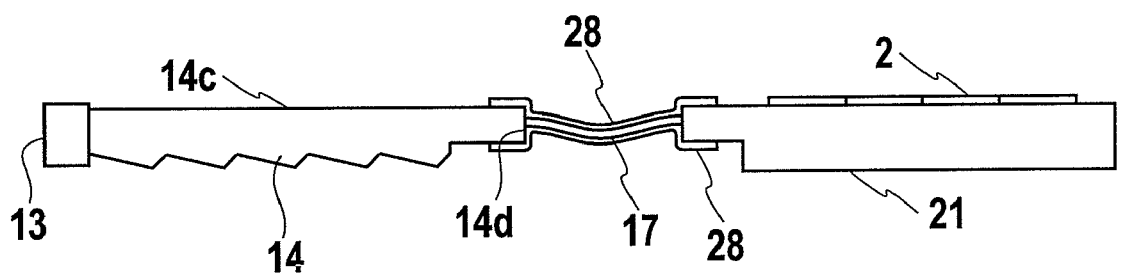
FIG. 8 shows a first specific example in which the first lighting region and the second lighting region are connected via the optical connecting member.

FIG. 8 shows the configuration in which the light guide plate 14 of the first lighting region and the optical connecting member 17, and the optical connecting member 17 and the key operating part side, light guide plate 21 of the second lighting region are connected either by a film shaped sticky sheet 28 or sticky tape 28.

Figure 9:
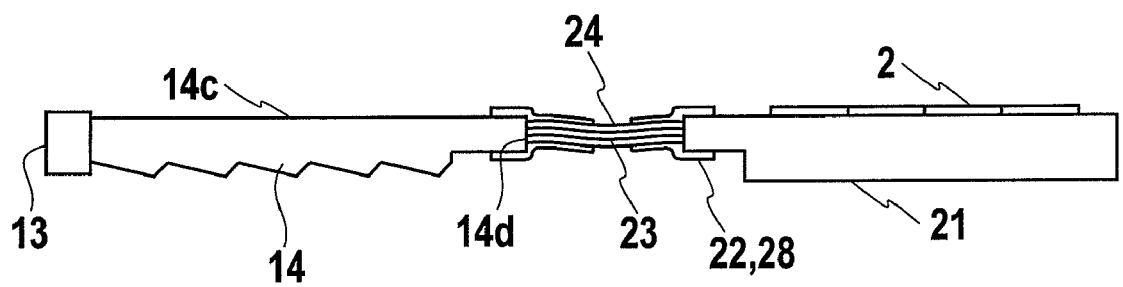
FIG. 9 shows a second specific example in which the first lighting region and the second lighting region are connected via the optical connecting member.

FIG. 9 shows the configuration in which the light guide plate 14 of the first lighting region and an optical connecting member comprised of the core 23 and the cladding layer 24, and the optical connecting member comprised of the core 23 and the cladding layer 24 and the key operating part side, light guide plate 21 of the second lighting region are connected via the adhesive agent 22 comprised of resin, or the film shaped, sticky sheet 28, or the sticky tape 28.

Figure 10:
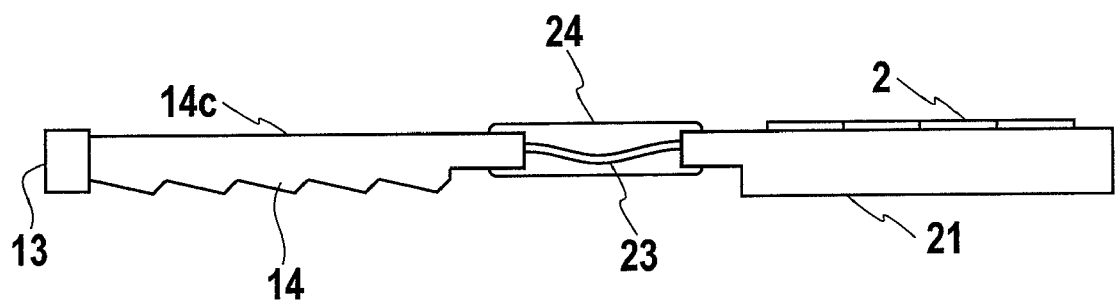
FIG. 10 shows a third specific example in which the first lighting region and the second lighting region are connected via the optical connecting member.

FIG. 10 shows the configuration in which the light guide plate 14 of the first lighting region and the optical connecting member 17, and the optical connecting member 17 and the key operating part side, light guide plate 21 of the second lighting region are connected by being laminated by the cladding 24, formed so as to cover both above and below the core 23 of the optical connecting member.

Figure 11:
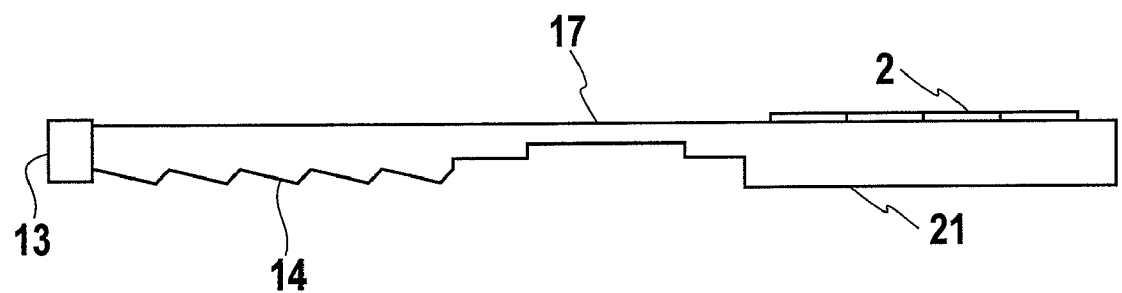
FIG. 11 shows a fourth specific example in which the first lighting region and the second lighting region are connected via the optical connecting member.

FIG. 11 shows the configuration in which the light guide plate 14 of the first lighting region and the optical connecting member 17, and the optical connecting member 17 and the key operating part side, light guide plate 21 of the second lighting region are formed as an integrated body by a transparent material with a constant refractive index used for the light guide plate. That is to say, the light guide plate 14, the key operating part side, light guide plate 21 and the optical connecting member 17 are formed into an integrated body by the same flexible resinous material.

The light guide plate 14 of the first lighting region and the optical connecting member 17, and the optical connecting member 17 and the key operating part side, light guide plate 21 of the second lighting region can be mechanically interlock connected using a connector part.

Figure 12:
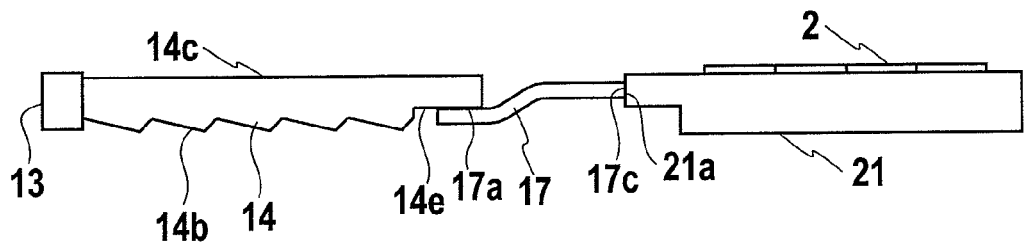
FIG. 12 shows a fifth specific example in which the first lighting region and the second lighting region are connected via the optical connecting member.
Figure 12:
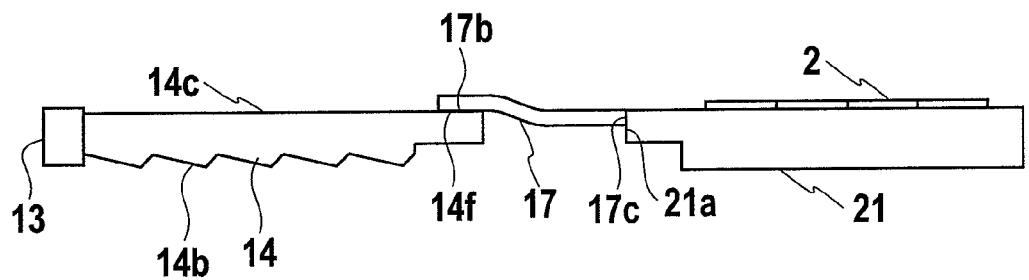
Figure 12:
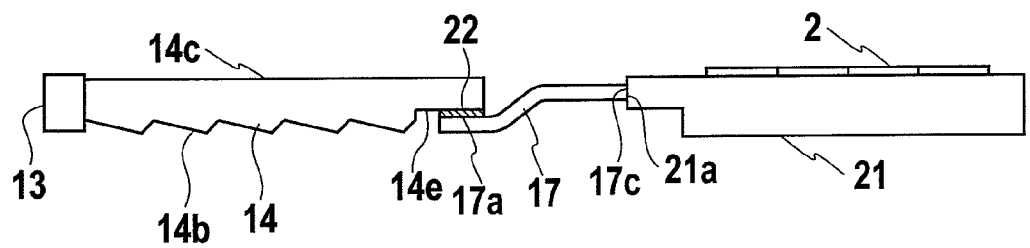
Figure 12:
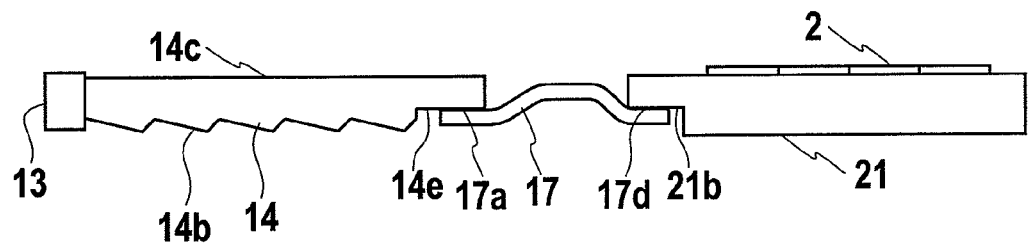

As shown in FIG. 12(*a*)-(*d*), the light guide plate 14 of the first lighting region (display 8) and the optical connecting member 17, and the optical connecting member 17 and the key operating part side, light guide plate 21 of the second lighting region (key operating part 2) can be connected each overlapping one on another. FIG. 12(*a*) shows the specific example in which the extending part 14e of the reflecting surface 14b of the light guide plate 14 overlaps in connection with a part 17a of the upper surface of one end of the optical connecting member 17. The other end part 17c of the optical connecting member 17 connects with the end part 21a being the other end of the key operating part side, light guide plate 21.

FIG. 12(*b*) shows the example in which the extending part 14f of the first outgoing surface 14c of the light guide plate 14 overlaps in connection with a part 17b of the lower surface of one end of the optical connecting member 17. The end part 17c being the other end of the optical connecting member 17 connects with the end part 21a at the other end of the key operating part side, light guide plate 21.

FIG. 12(*c*) shows the example in which the extending part 14e of the reflecting surface 14b of the light guide plate 14 overlaps in connection with the part 17a of the upper surface of one end of the optical connecting member 17 via the adhesive agent 22. The end part 17c being the other end of the optical connecting member 17 connects with the end part 21a at the other end of the key operating part side, light guide plate 21. Further, in FIG. 12(*c*) the optical connecting member 17 is connected at the reflecting surface 14b side of the light guide plate 14, however it may be connected at the first outgoing surface 14c side of the light guide plate 14.

FIG. 12(*d*) shows the example in which the extending part 14e of the reflecting surface 14b of the light guide plate 14 overlaps in connection with the part 17a of the upper surface of one end of the optical connecting member 17, moreover the part 17d of the upper surface at the other end of the optical connecting member 17 connects to the upper surface 21b of the other end of the key operating part side, light guide plate 21. Further, in FIG. 12(*d*) the optical connecting member 17 is connected at the reflecting surface 14b side of the light guide plate 14, however it may be connected at the first outgoing surface 14c side of the light guide plate 14 and it may be connected using an adhesive agent. Again, the optical connecting member 17 is connected to the lower surface 21b of the key operating part side, light guide plate 21 however it may also be connected to the upper surface, and may be connected using an adhesive agent.

In the above specific examples light is conveyed from lower refractive index material to the higher refractive index material, thus selection of the material used and the angle of their combinations are important. Further, there are various methods of connecting each light guide plate and the optical connecting member, and in (c) adhesive agent is employed, but the connection methods as described in FIGS. 5-11 can be utilized.

The optical connecting member 17 described above must of course be flexible, but must have folding endurance and elasticity. For example, it is preferable that the rate of increase of optical insertion loss in the 360° bending test with radius of curvature 2 mm is not more than 1 dB; that the rate of increase of optical insertion loss after the repetitive bending test with radius of curvature 5 mm is repeated 100,000 times is not more than 1 dB; and that mechanical damage such as cracks does not occur in the core after the repetitive bending test with radius of curvature 2 mm is repeated 100,000 times. The existence of such mechanical damage such as cracks can be confirmed under a magnifying lens, under a microscope or with the naked eye. Moreover, it is preferable in the optical connecting member 17, that the coefficient of elasticity using a film tensile test is 0.05-6 GPa.

Bending at a radius of curvature 5 mm repeated 100 times each day and further continuing this over three years results in testing approximately 100,000 times. Naturally, repeating the bending 30 times each day is equivalent to continuing use for about 10 years.

Further, optical transmission loss of the optical connecting member 17 in the 450-750 nm wavelength regions should be not more than 3 dB/cm.

Again, the optical connecting member 17 has a core part and a cladding part the refractive index of which is lower than that of the core part, and the relative refractive index difference of the cladding part and the core part of the optical connecting member is 1-50%. This value applies to the case in which the optical connecting member comprises only the core part and the cladding part is air. The thickness of the end surface opposing the first lighting region of the optical connecting member is 0.01-2 mm.

In respect of any of the above described examples, in addition to the optical connecting member 17, it is possible to employ a member used for another purpose, that is flexible like the optical connecting member 17. For example, a configuration in which a circuit substrate used as a medium for conveying light as electrical signals is integrated either by pressure or connection to the optical connecting member 17 is feasible.

Further, the second lighting region illuminates each key of the key operating part through the operation of the light guide plate.

Figure 13:
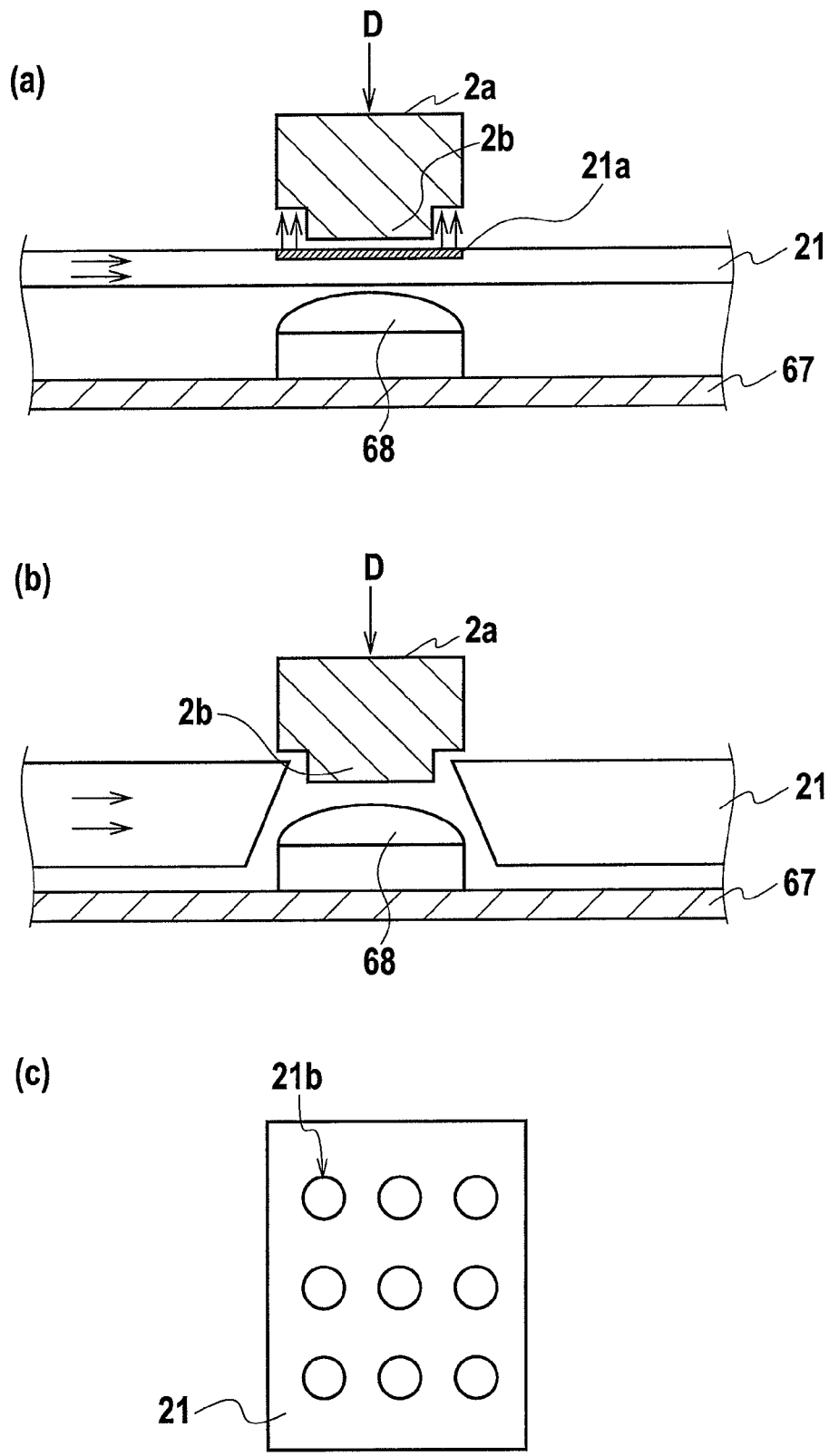

FIG. 13 is a cross-sectional view of the region of the key 2a region of the key operating part 2. When the key 2a of the key operating part 2 is depressed in the direction of the arrow D, the function ascribed to the key switch turns on. As light from the key operating part side, light guide plate of a key operating part side 21 passes the key 2a side each key is illuminated.

FIG. 13(a) is an example showing a cross-sectional view of the position of the key 2a of the key operating part 2. As shown in that drawing, the key 2a is arranged over the switching elements 68 disposed on a substrate 67, via a light guide plate 21. A convex part 2b is disposed at the lower side of the key 2a. In response to pressure from the key 2a, the convex part 2b pressures the switching elements 68 over the substrate 67 via the flexible light guide plate 21, to complete the switching action. Reflective elements 21a that diffract light entering the light guide plate of a key operating part side 21 via the optical connecting member 17 at substantially 90°, thereby projecting the light to the lower surface of the key 2a, are formed in a region substantially relative to the key 2a on the light guide plate of a key operating part side 21. The reflective elements 21a can be provided by using reflective elements used for commonly known light guide plates providing the backlights for ordinary liquid crystal display apparatus such as those providing a fine prism form or dot form or the like. Further, in FIG. 13(a), the reflective elements 21a are formed at the side in contact with the key 2a of the light guide plate 21, however these elements can also be formed at the opposite side having the switch elements 68.

FIG. 13(b) is another example showing a cross-sectional view of the position of the key 2a of the key operating part 2. Here, as shown in FIG. 13(c), openings 21b are positioned in locations corresponding to the key 2a of the light guide plate of a key operating part side 21, and the convex part 2b of the lower surface of the key 2a directly pushes the switching elements 68. Light entering the light guide plate of a key operating part side 21 via the optical connecting member 17 is reflected at the side faces of the openings 21b and projected to the lower surface of the key 2a. Tapers are formed for the side surfaces of the openings 21b to facilitate projection to the lower surface of the key 2a.

In both FIGS. 13(a) and (b), the substrate 67 and the switching elements 68 can be covered with a flexible, thin sheet. In this case, a white colored sheet is preferable in order to more brightly project light to the lower surface of the key 2a.

It is preferable to provide a setting configuration in which illumination to both the first lighting region and the second lighting region goes off if a certain time has elapsed without activity, and returns when some action, such as pushing a key switch or the like, is performed. In the case of the present invention, when illumination to the first lighting region is on, illumination to the second lighting region also, goes to on.

Figure 14:
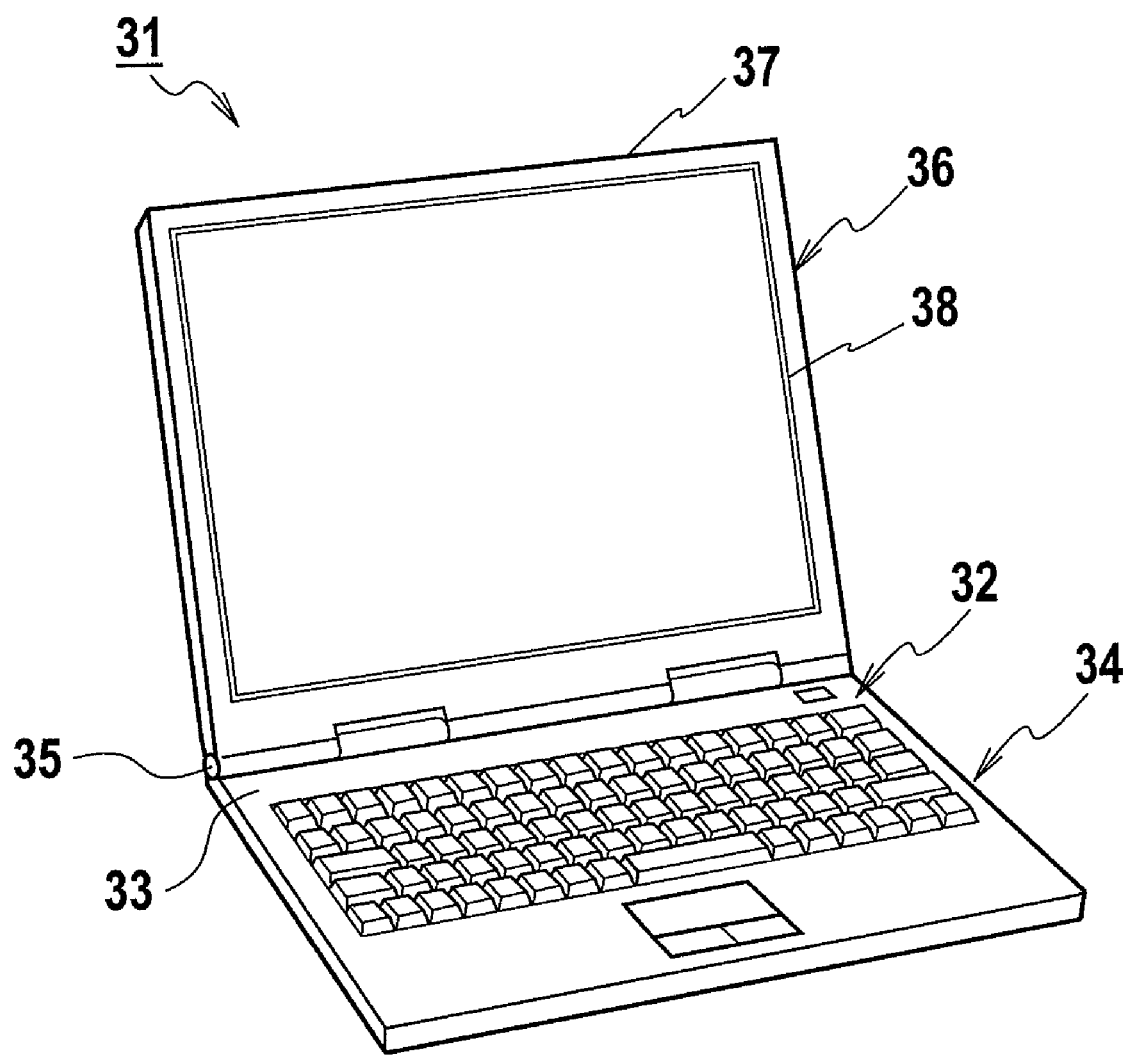
FIG. 14 is an external perspective view of a personal computer suited to application of the present invention.

Further, the present invention can be utilized not only for the portable telephone as shown in FIG. 2, but can also be applied for a portable information terminal or personal computer. FIG. 14 is an external perspective view showing a personal computer 31 to which the present invention can be applied. This personal computer 31 is a folding shut type, comprising a main body 34 which further provides a key operating part 32 and a surface 33, and a closing lid 36 connected to the main body 34 via a hinge 35 that enables the closing lid 36 to open and close. That is to say, the main body 34 and closing lid 36 are connected so as to be able to rotate, via the hinge 35. A display part 38 is provided in the surface 37 which forms the surface opposing the key operating part 32. This display part 38 displays image or character information based on the operations performed using the key operating part 32 of the main body 34.

The main body 34 provides the key operating part 32 itself comprised of a plurality of keys, formed in the surface 33. Further, the main body 34 houses internally memory such as EEPROM or the like, a control part such as a CPU, and signal processing parts providing wireless functions and transmission functions or the like. A special characteristic of the main body 34 is the provision of the key operating part side, light guide plate that guides light emitted from a surface light source of the closing lid 33 for illuminating the key operating part 32.

The closing lid 36 provides the display part 38 in the surface 37. The display part 38 comprises a surface light source and a liquid crystal display part illuminated by the surface light source. The liquid crystal display part is provided with a surface light source within the closing lid part. The surface light source has a light source such as for example a white lighting LED and a display part side, light guide plate, that reflects or passes incoming light when light is input from this light source, to illuminate the liquid crystal display part.

Moreover, between the main body 34 and the closing lid 36 an optical connecting member is provided that flexibly connects the display part side, light guide plate and the key operating part side, light guide plate and operates as a connecting member guiding light emitted from the light source to the key operating part side, light guide plate. The optical connecting member passes partly within the hinge 35 that rotatably connects the main body 34 and the closing lid 36.

The display part side, light guide plate, the key operating part side, light guide plate at the optical connecting member are as described with reference to FIGS. 3 through 13. Thus, in the personal computer 31, light from the light source 13 is used to illuminate the liquid crystal display part 38 and simultaneously, light from the same light source 13 is used to illuminate the key operating part 32. Accordingly, the personal computer 31 realizes low power consumption and cost reductions.

The display apparatus according to the present invention could include for example, that of a foldable portable telephone, a portable telephone device such as a twin screen portable telephone or the like, a personal computer, a twin screen portable game machine or an electronic dictionary with screen for handwritten input.

Figure 15:
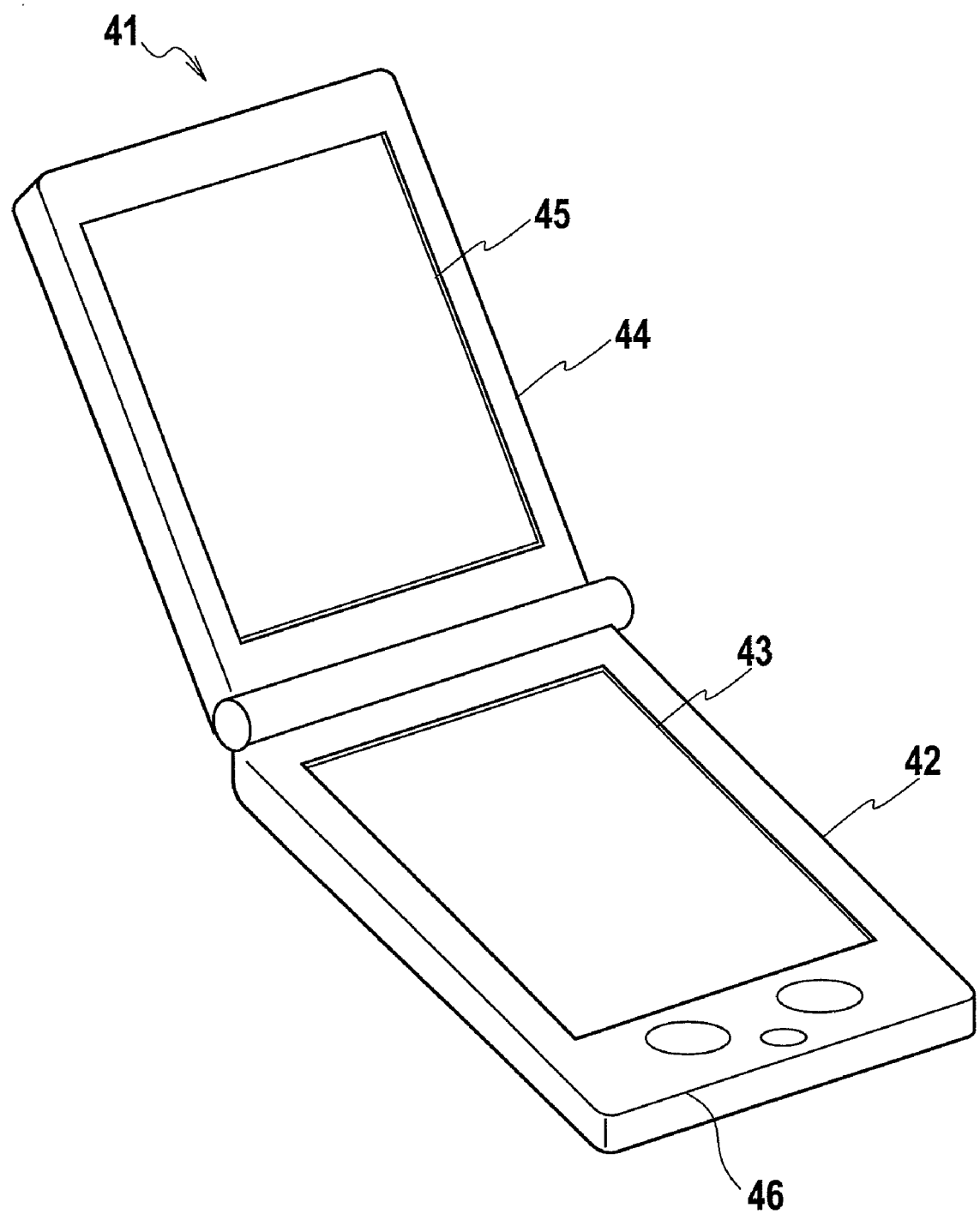
FIG. 15 is an external perspective view of a twin screen portable telephone suited to application of the present invention.

FIG. 15 is an external perspective view of a twin screen, foldable portable telephone 41. The first display part (liquid crystal display) 43 provided in the main body 42 forms the second lighting region, while the second display part (liquid crystal display) 45 provided in the closing lid 44 forms the first lighting region. A microphone 46 or the like, is installed in the closing lid 42. The first display part 43 forms a touch panel. The touch panel can display a plurality of different kinds of icons in the screen. Weather information can also be displayed.

Figure 16:
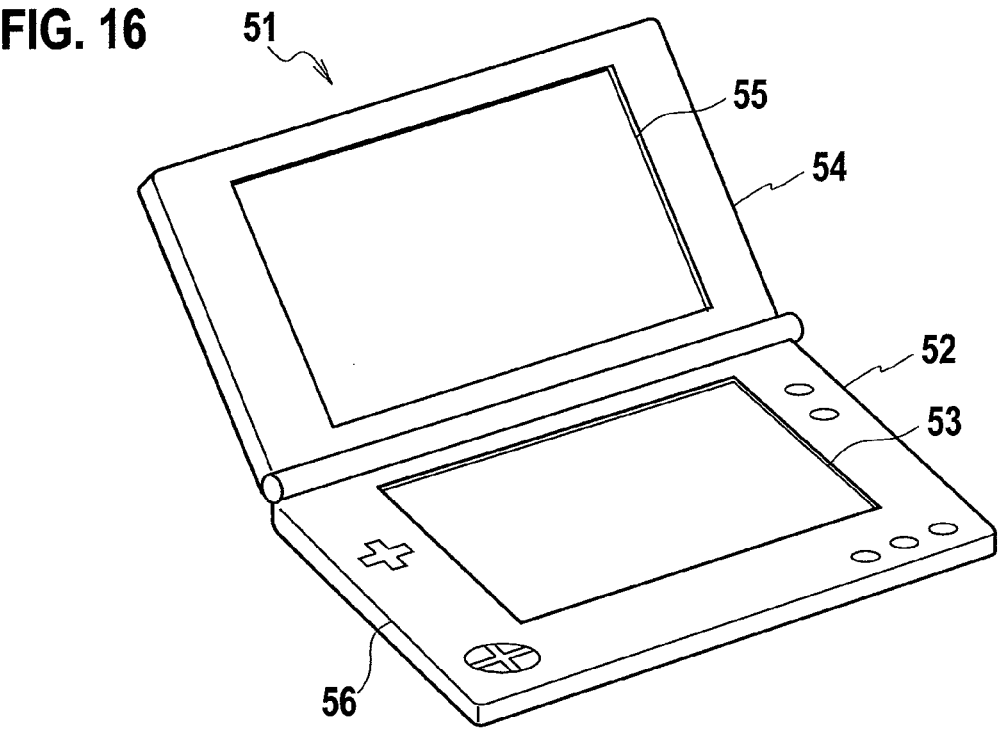
FIG. 16 is an external perspective view of a twin screen portable game machine suited to application of the present invention.

FIG. 16 is an external perspective view of a twin screen, portable game machine 51. The first display part (liquid crystal display) 53 provided in the main body 52 forms the second lighting region, while the second display part (liquid crystal display) 55 provided in the closing lid 54 forms the first lighting region. A key operating part 56 is installed in the main body 52. The first display part 53 forms a touch panel. The touch panel is operated as the user directly touches the screen.

Figure 17:
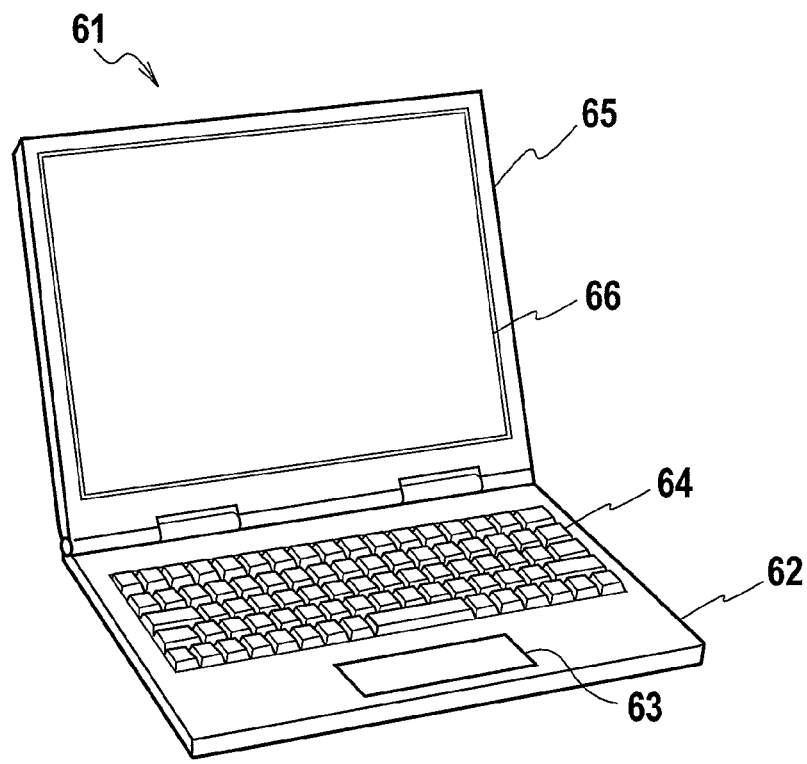
FIG. 17 is an external perspective view of a handwritten input screen electronic dictionary suited to application of the present invention.

FIG. 17 is an external perspective view of an electronic dictionary 61 with screen for handwritten input. A handwritten input screen (touch panel) 63 and key operating board 64 are provided in the main body 62. These handwritten input screen 63 and the operating part 64 are equivalent to the second lighting region. A display part (liquid crystal display) 66 that displays character information and the like that is the main information of the dictionary, is installed in the closing lid part 65. This display part 66 corresponds to the first lighting region.

The invention claimed is:

1. An optical connecting member configured such that between a first lighting region having a light source and a light guide plate, and a second lighting region, wherein light from the light source enters the light guide plate at an end surface and is emitted from a main surface of the light guide plate such that the light source and the light guide plate are configured to operate as a surface light source, light emitted from an other end surface opposing the end surface of the light guide plate is guided to the second lighting region.

2. The optical connecting member according to claim 1, wherein the transmittance of light of a wavelength region corresponding to the color illuminating the second lighting region is not less than 85%.

3. The optical connecting member according to claim 1, wherein the rate of increase of loss in the 360° bending test with the bending radius of 2 mm is not more than 1 dB.

4. The optical connecting member according to claim 1, wherein the rate of increase of optical insertion loss after the repetitive bending test with the bending radius of 5 mm is repeated 100,000 times is not more than 1 dB.

5. The optical connecting member according to claim 1, wherein mechanical damage such as cracks does not occur in the core after the repetitive bending test with the bending radius of 2 mm is repeated 100,000 times.

6. The optical connecting member according to claim 1, wherein the coefficient of elasticity using a film tensile test is 0.05-6 GPa.

7. The optical connecting member according to claim 1, wherein the thickness of the end surface opposing the light guide plate is 0.01-2 mm.

8. The optical connecting member according to claim 1, wherein the optical connecting member has a core part and a cladding part.

9. The optical connecting member according to claim 8, wherein the relative refractive index difference of the cladding part and the core part is 1-50%.

10. The optical connecting member according to claim 8, wherein the exterior of the cladding part has a supporting film.

11. The optical connecting member according to claim 1, wherein the optical connecting member is a flexible optical waveguide having a core part and cladding part.

12. The optical connecting member according to claim 1 comprising glass fibers, plastic fibers or resin tubes arranged in parallel.

13. The optical connecting member according to claim 1 comprising glass fibers, plastic fibers or resin tubes laid inside resin.

14. A display apparatus comprising:
the optical connecting member according to claim 1;
a first lighting region;
a second lighting region;
the first lighting region has a light source and a light guide plate;
the optical connecting member guides light emitted from the other end surface of the light guide plate to the second lighting region.

15. The display apparatus according to claim 14, wherein the first lighting region and the optical connecting member, and the optical connecting member and the second lighting region are connected via an adhesive agent comprised of resin.

16. The display apparatus according to claim 14, wherein the first lighting region and the optical connecting member, and the optical connecting member and the second lighting region are connected via a film shaped sticky resinous sheet or by a resinous tape.

17. The display apparatus according to claim 14, wherein the first lighting region and the optical connecting member, and the optical connecting member and the second lighting region are connected via a film shaped sticky resinous sheet or via a resinous tape, and again via an adhesive agent comprised of resin.

18. The display apparatus according to claim 14, wherein the optical connecting member has a core part and cladding part, and the first lighting region and the optical connecting member, and the optical connecting member and the second lighting region, are connected by being laminated by a cladding layer formed so as to cover both above and below the core part of the optical connecting member.

19. The display apparatus according to claim 14, wherein the first lighting region and the optical connecting member, and the optical connecting member and the second lighting region are mechanically joined using a connector part.

20. The display apparatus according to claim 14, wherein the second lighting region has a light guide plate, and the light guide plate of the first lighting region and the optical connecting member and the light guide plate of the second lighting region are formed into an integrated body by the same flexible, resinous material.

21. The display apparatus according to claim 14, wherein the first lighting region is provided with a closing lid part, the second lighting region is provided with a main body, and the optical connecting member and the closing lid part and the main body are rotatably connected via a hinge part.

22. A display apparatus including the optical connecting member according to claim 1, the display apparatus comprising:
a first lighting region providing a surface light source part having a light source and a light guide plate, and a liquid crystal display part that is illuminated by the surface light source, wherein the first lighting region reflects or passes light from the light source, emits light from a first outgoing edge opposing the liquid crystal display part to illuminate the liquid crystal display part, and also emits light from a second end surface opposing the optical connecting member;

a second lighting region having a key operating part connected to the first lighting region via the optical connecting member so as to be able to open and close; and the optical connecting member flexibly connects, and is positioned between, the first lighting region and the second lighting region, and the optical connecting member guides the light emitted from the second end surface of the first lighting region to the second lighting region, wherein the display apparatus functions as an information processing device with lighting functionality that displays image information or character information on the liquid crystal display part based on operations performed using the operating part.

23. The display apparatus according to claim 22 in which the information processing device with lighting functionality is a portable telephone.

24. The display apparatus according to claim 22 in which the information processing device with lighting functionality is a personal computer.

* * * * *